May 24, 1927.
W. M. PHELPS
LIQUID LEVEL INDICATOR
Filed April 12, 1922
1,629,732
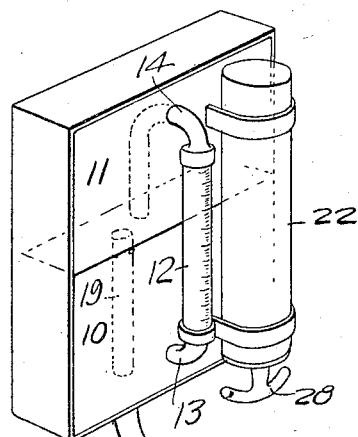
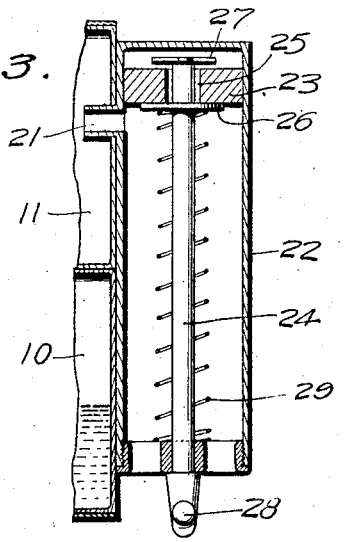
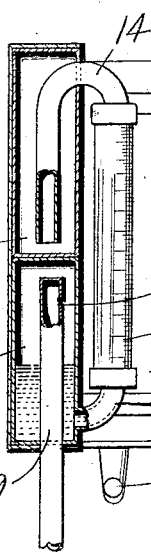
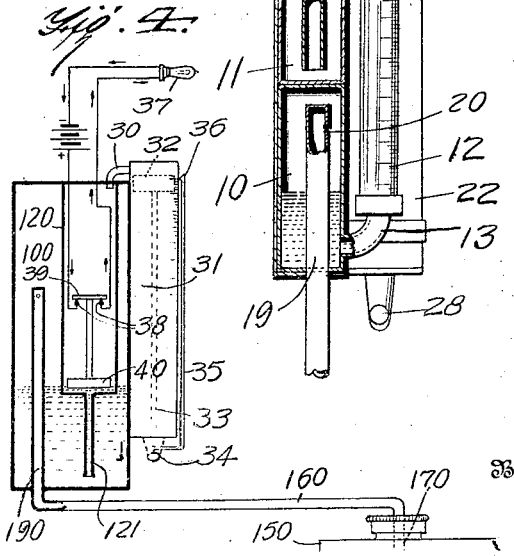
Inventor
Wilbur M. Phelps,
By
Attorney Patented May 24, 1927.

1,629,732

UNITED STATES PATENT OFFICE.

WILBUR M. PHELPS, OF STAUNTON, VIRGINIA.

LIQUID-LEVEL INDICATOR.

Application filed April 12, 1922. Serial No. 551,865.

My invention relates to indicators or gages for showing the levels of liquids in tanks that are more or less removed from the gage or indicator, and in particular to such devices for showing the level, and therefore the quantity, of gasoline or other fuel in the storage tanks of automobiles, and since my invention has especial reference to this particular use, I shall illustrate and describe its embodiment in connection with an automobile. My object is to provide apparatus for the purpose stated which is simple of construction and therefore inexpensive to make, which will be accurate, and therefore its indications can be relied upon, which will call for or require little effort or trouble in such manipulation as may be necessary, and which, having reference to automobile use, can be installed upon the instrument board of the car without being in the way or interfering with other appliances usually mounted upon the instrument board of a car. My invention consists in whatever is described by or included within the meaning or scope of the appended claims.

In the accompanying drawings:

Fig. 1 is a view illustrating an embodiment of my invention for automobile use, that portion of the instrument which is mounted upon the instrument board of the car being shown in perspective, and the gasoline tank in vertical section;

Fig. 2 is a vertical section through the indicator device.

Fig. 3 is a detail view of the air pump I prefer;

Fig. 4 is a view in vertical section with parts in elevation of another form of my invention.

Referring now in detail to what is shown in the drawings, there are two chambers or receptacles, 10 and 11, respectively, placed one above the other which are in the form of a flat-sided box, each being separately made, or, if preferred, a single box may be employed, and provided with a horizontal partition which separates its interior into two distinct chambers. The lower chamber in use is intended to be partially filled, say to one third of its height, with a liquid, preferably a light oil,—transformer oil, for example, and in communication with the lower chamber, 10, near its bottom is a gage that may be of familiar construction consisting of a glass or transparent vertical tube, 12, which at its lower end is connected liquid-tight with an elbow, 13, that is connected with the bottom of the chamber, 10, and in like manner at its top is connected by an elbow, 14, that extends into the top of the upper chamber, 11, and within the latter is extended downward nearly to the bottom of such chamber, 11. Thus the oil or other liquid in the lower chamber, 10, may pass into the glass tube and its level therein be visible, which level, as hereinafter explained, depends upon the level of the gasoline in the storage tank, 15, of the car, the interior of which is in communication with the interior of the lower chamber, 10, by suitable tubing or a pipe, 16, there being within the tank, 15, a vertical pipe, 17, that extends from a point near the bottom of the tank where it has a small inlet opening, 18, to or through the top of the tank whereat the pipe connection, 16, is made. Within the lower chamber, 10, is a vertically extending pipe, 19, to whose lower end at or below the bottom of the chamber, 10, is connected the pipe, 16, which pipe, 19, extends nearly to the top of the chamber, 10, where it has a small hole, 20, which establishes communication between the interior of the chamber, 10, and the interior of such pipe, which is at a point above the level of the liquid in the chamber, 10. It will thus be seen that a column or body of air will extend between the level of the liquid in the gas tank pipe, 17, and the level of the oil in the chamber, 10, which body of air will be subjected to a pressure according to the level of liquid in the gas tank and that pressure will determine the level of the liquid in the glass indicator gage, such level rising with increase of level of the gasoline in the tank, 15, and falling with the decrease of the level in the tank, 15. The glass gage will have a suitable scale marked upon it whose graduations will correspond with certain levels of gasoline in the tank, 15. For example, one graduation can denote that the gas tank is full, another that it is three quarters full, and so on.

Accuracy of reading must take into account, the effect of temperature changes on the apparatus, and in particular upon the column or body of air for transmitting pressure from the gasoline tank to the indicating liquid. I therefore provide means by which, for each reading, a fresh or new supply of pressure-transmitting air column or body may be furnished. I accomplish this by use of some air forcing device which may be of any desired nature or form such as a piston pump, or bellows, or rubber bulb by which all of the air at the time a reading is desired to be taken may be expelled out of the chamber, 10, and the pipe connection with the fuel tank, 15, and a new supply introduced.

For this purpose I run a pipe, 21, into the upper chamber, 11, to which is connected an air forcing device such as the pump shown by which air is pumped into the chamber, 11, and thence passes through the glass gage, expelling before it the oil in the gage, and into the lower chamber, 10, and from the latter the fresh incoming air passes through the piping into the gas tank, 15, driving before it the stale air and such gasoline as may be in the pipe, 17, in the gas tank, the air thus expelled into the gas tank being vented therefrom by the vent customarily provided, and thus fresh air slightly above atmospheric pressure may be placed in the piping between gas tank and chamber, 10, so that the gasoline temporarily expelled from the pipe, 17, in the gas tank, 15, may reenter the pipe to the level in the tank, and moving the air in such pipe, 17, upward, as it enters, will, through the air body or column that reaches to the lower chamber, 10, move the oil therein out into the gage tube and to the level corresponding with the gasoline level in the storage tank, 15. The quantity of air displaced in the pipe, 17, by the gasoline entering therein is transferred to the chamber, 10, and by the increase of air added to the latter the indicating oil is expelled from such chamber to the glass gage and the reverse movement of air takes place when the quantity of gasoline in the fuel tank pipe, 17, diminishes. The hole, 20, in pipe, 19, is small so that there will be no tendency of the air flowing to chamber, 10, from pipe, 19, to cause the oil to flow in spurts or in an agitated manner into the glass gage.

The upper chamber, 11, will receive oil from the glass gage, which for any reason, in the working of the apparatus may flow therefrom, and such oil as may thus enter chamber, 11, will be forced therefrom back into the glass gage by the action of the air pumping device.

In installing my apparatus on the dash or instrument board, it may be arranged so that only the glass gage and operating member of the air pump are visible.

In the use of my apparatus all that is necessary to get an actuate indication of the quantity of gasoline in the tank is to operate the air pump, and then note the level of the liquid in the gage, which can be done by one on the car seat.

Any desired form of air forcing device may be used but I prefer the pump shown best in Fig. 3 which comprises a cylinder or barrel, 22, placed in a vertical position which is closed at the top, but open at the bottom and near the top opens into the pipe, 21, and has a piston, 23, which is mounted loosely on the upper end of the piston rod, 24, between a disk, 26, below the piston and a spider, 27, above the piston, the space between the disk and spider being greater than the thickness of the piston. The hole, 25, in the piston through which the piston rod passes is sufficiently large to constitute a free passage for air. It will be seen that when the piston rod is moved downward, (which may be done by a handle, 28, at its lower end), the spider, 27, will move into contact with the top of the piston and thereby move the piston downward, and the disk, 26, will be spaced below the piston, so that air may pass freely upward through the hole, 25, and hence the descent of the piston will not result in sucking air out of the chamber, 11, through the hole or pipe, 21. However, when the piston rod, 24, is moved upward the disk, 26, will engage the underside of the piston and close the hole, 25, at the bottom so that air will be forced upward in the barrel by the piston and into the chamber, 11, through the pipe, 21. The upward movement of the piston rod is preferably caused by a coil spring, 29. When at its highest point in the barrel, 22, the piston, 23, is above the pipe, 21. It will be seen that my pump is a most simple and highly efficient one and admirably fitted for use as a part of the apparatus.

In Fig. 4 I illustrate an embodiment of my invention different from that shown in the other figures, it comprising a tank, 100, into which extends a pipe, 190, that is connected by a pipe, 160, with the pipe, 170, that enters the gasoline tank, 150, and in the tank, 100, is a quantity of oil whose level is determined by the quantity of gasoline in the tank, 150, in a similar manner to the case of the aparatus shown in Fig. 1. Within the tank, 100, is a cylinder, 120, from the bottom of which a very small pipe, 121, extends into the liquid in the tank, 100, by which pipe, 121, the liquid may flow back and forth between tank, 100, and the cylinder, 120. The top of the cylinder, 120, is connected by a pipe, 30, with a piston air pump, 31, the piston, 32, of which is mounted on a piston rod, 33, that has a handle, 34, below the pump cylinder, and to the piston rod is attached a light rod, 35, that extends parallel with the pump cylinder close to the exterior thereof and at its upper end has a pointer or index, 36, that co-operates with a scale consisting of graduations or words, if desired, that refer to the quantity of gasoline in the tank, 150. By means of the pump, 31, the liquid entering the cylinder, 120, from the tank, 100, to a level that indicates the level of the gasoline in the tank, 150, may be forced from the cylinder, 120, and the position of the piston, 32, and the index, 36, is determined by the extent of movement of the piston necessary to expel the liquid from the cylinder, 120, and thus the level of gasoline in the tank, 150, may be indicated. When all the liquid is expelled from the cylinder, 120, that fact is made known to the operator by suitable means, such, for example, as an electric lamp, 37, mounted in some convenient place which is in a circuit that includes stationary contact, 38, located about midheight of the cylinder, 120, which at the same time are touched by a metal plate, 39, carried by a float, 40, in the cylinder, 120, and thereby the circuit to the lamp is closed and the light flashes up. Thus the instant the light flashes, the operator knows that all the liquid has been expelled from the cylinder, 120, and he stops the expelling movement of the pump at that instant, and at that time the pointer, 36, is at the point on the scale that indicates the level of gasoline in the tank, 150.

It will be noted that in the construction shown in Fig. 4, the gage device comprises the cylinder, 120, into and out of which the liquid flows, and the index, 36, connected with the pump piston and moving therewith.

The employment of separate chambers, 10, and, 11, is important because otherwise there would be direct communication between the pipe or conduit, 19, and the upper end of the gage tube in the case of Figs. 1 and 2 and between the pipe, 190, and the eduction pipe, 30, of the pump in the case of the construction shown in Fig. 4 so that air pressure transmitted through said pipes from the gasoline container would not properly influence the level of the indicating fluid.

What I claim is:

1. The combination with a storage tank or receptacle for a liquid, a liquid holding chamber located away from the tank, a pipe leading from a point above the liquid level of said chamber into said tank to the minimum level to be gauged, a vertical liquid level gauge mounted adjacent said chamber so as to be readily visible and being in communication with such chamber below the level of liquid therein, means to expel the gauge contents into the chamber and the air and other contents from the pipe between such chamber and said tank, and to place atmospheric air in such pipe, and a second chamber with which the upper end of said gauge communicates, the means of communication being a pipe that terminates in such chamber and spaced from the bottom thereof, said second chamber being in communication with said means to expel the gauge contents.

2. The combination with a storage tank for liquid fuel for an automobile, a liquid holding chamber located away from the tank at a point on the automobile readily accessible, a pipe leading downward from within such chamber from a point above the liquid level of said chamber and extended to said tank to the minimum level to be gauged, a vertical liquid holding gauge mounted adjacent one side of said chamber so as to be readily visible, the lower end of said gauge being in communication with the lower part of said chamber, means mounted adjacent said gauge to expel the gauge contents into said chamber, and the air and other contents from the pipe between such chamber and said tank, and to place atmospheric air in such pipe, a second chamber situated above the first mentioned chamber, a pipe extending from the upper end of the gauge into said second chamber and opening into the lower part thereof, and means establishing communication between said expelling means and the upper part of said second chamber.

In testimony whereof I hereunto affix my signature.

WILBUR M. PHELPS.